March 19, 1940.    O. SHACKELFORD    2,193,942
GLASSWARE RECEIVING, CONVEYING, AND UPRIGHTING APPARATUS
Filed April 5, 1937    7 Sheets-Sheet 1
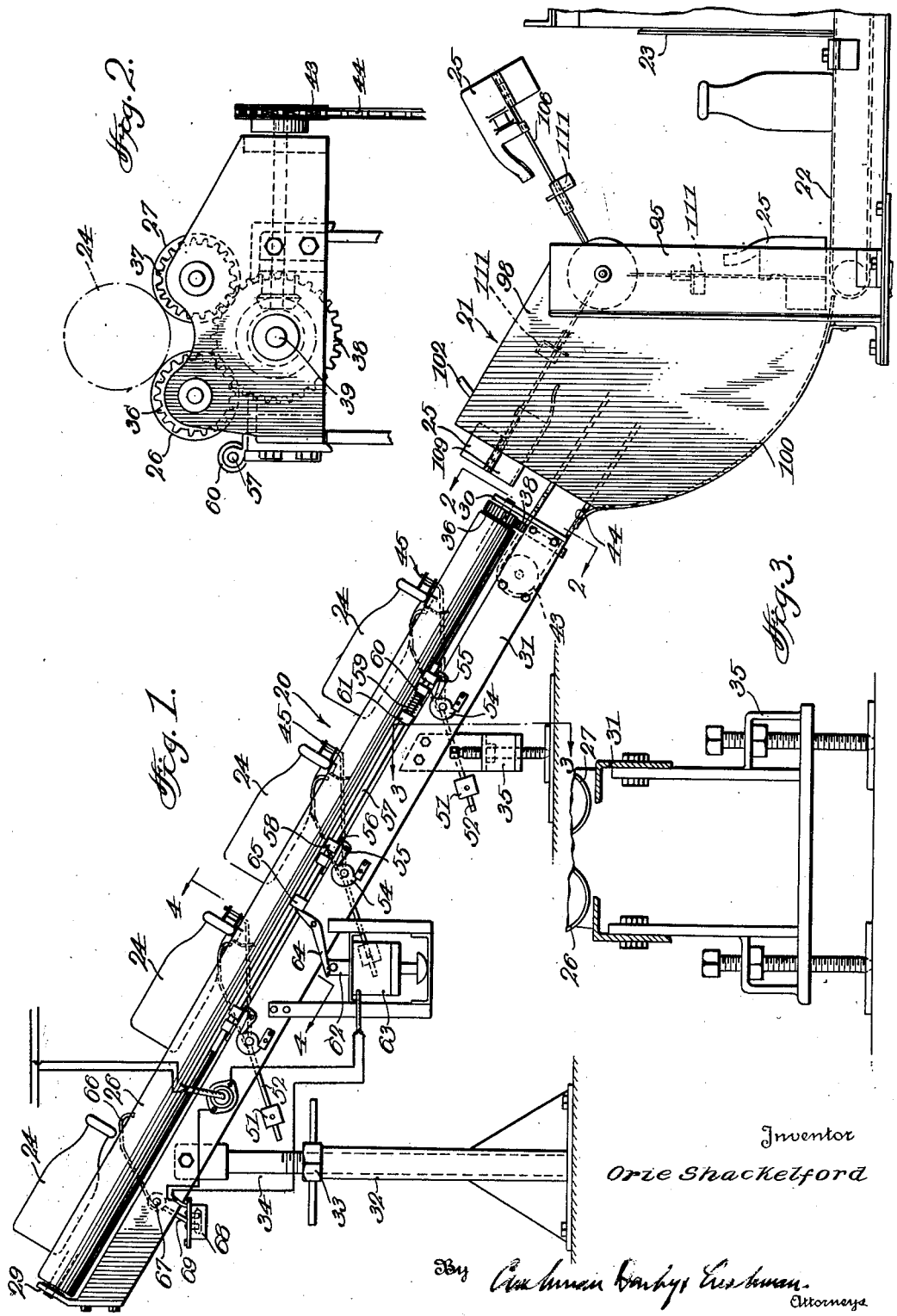
Inventor
Orie Shackelford

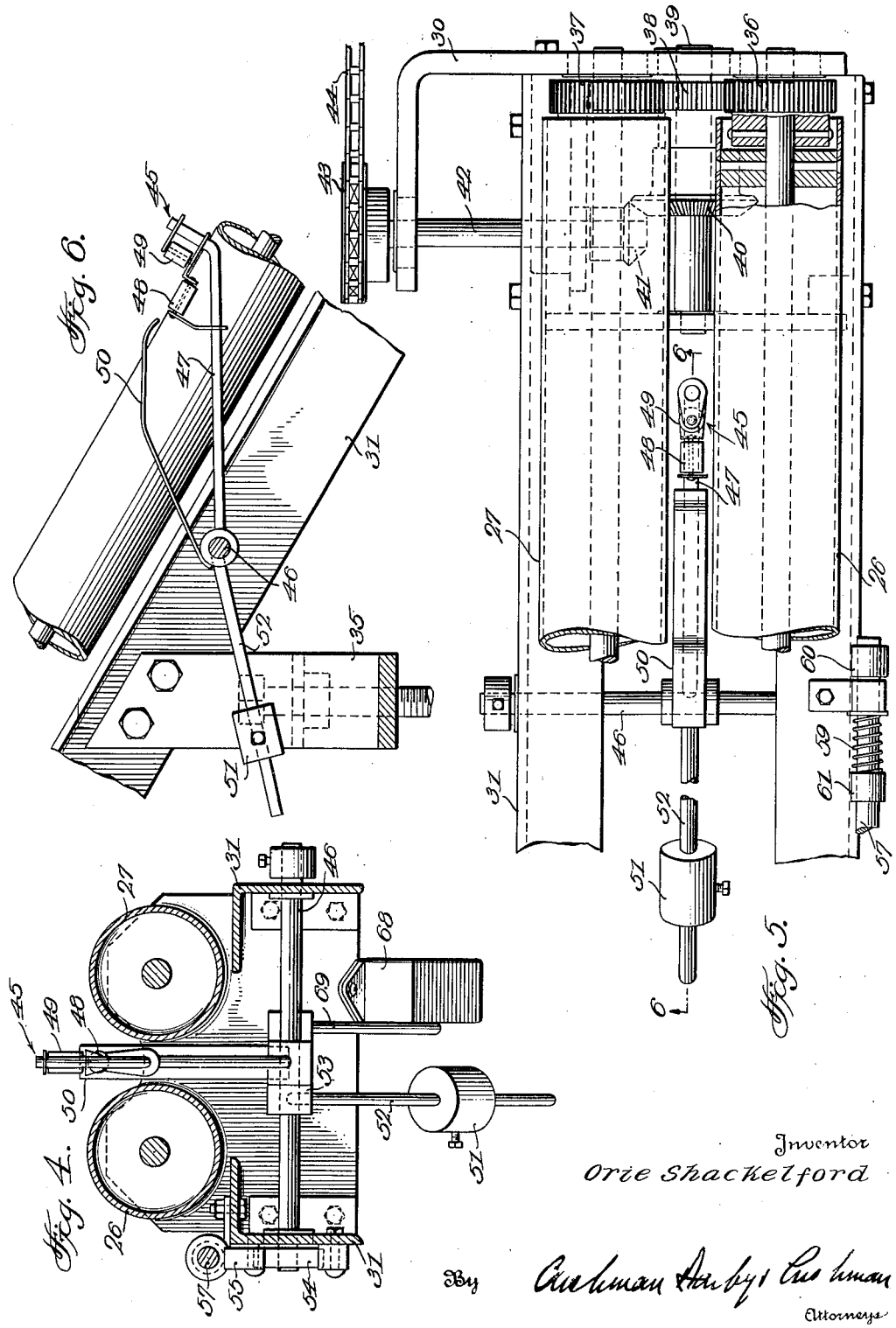

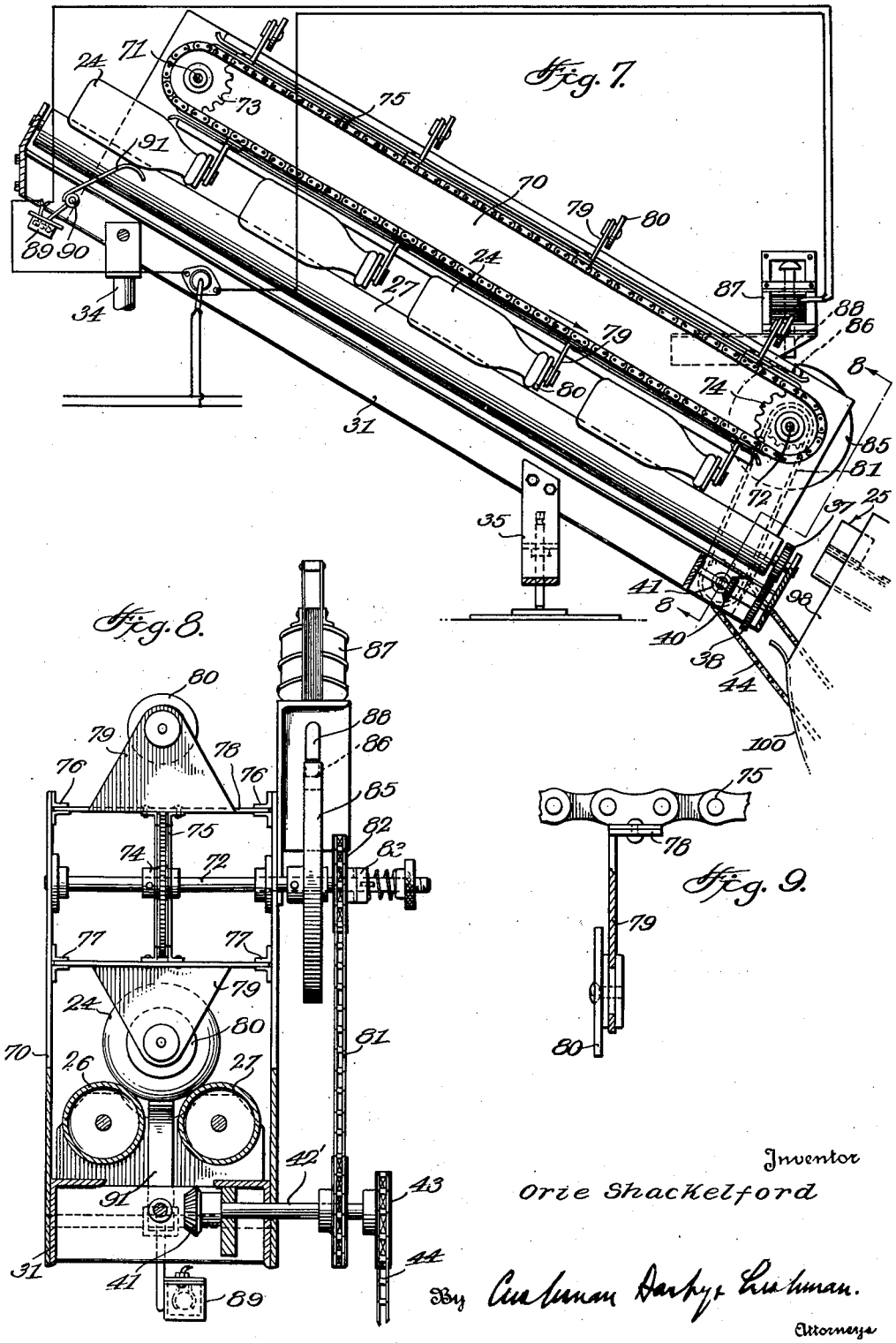

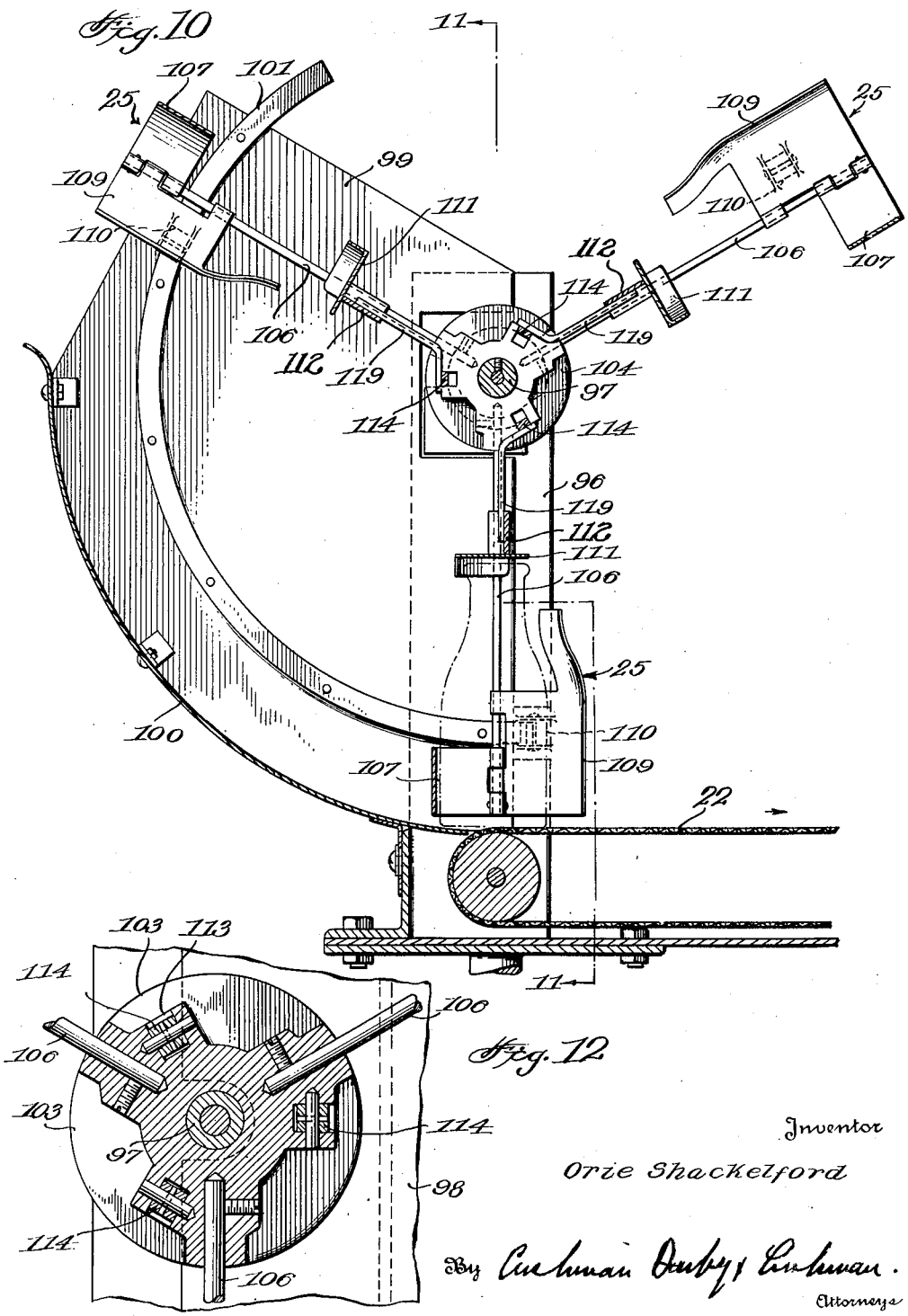

March 19, 1940. O. SHACKELFORD 2,193,942
GLASSWARE RECEIVING, CONVEYING, AND UPRIGHTING APPARATUS
Filed April 5, 1937 7 Sheets-Sheet 5
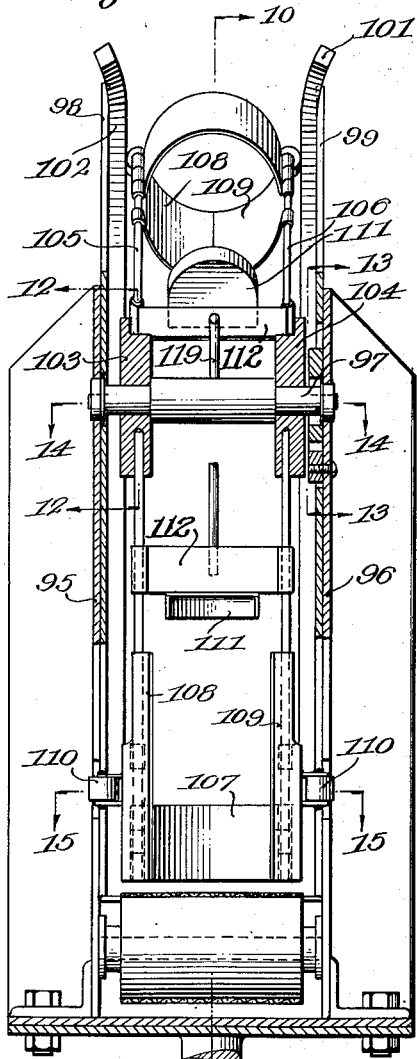
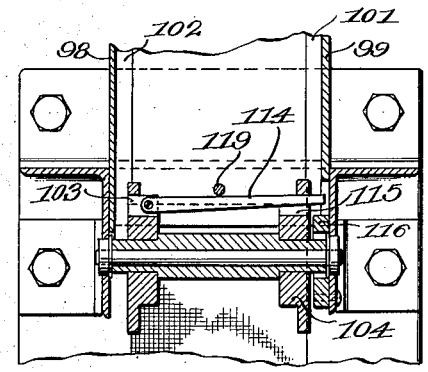
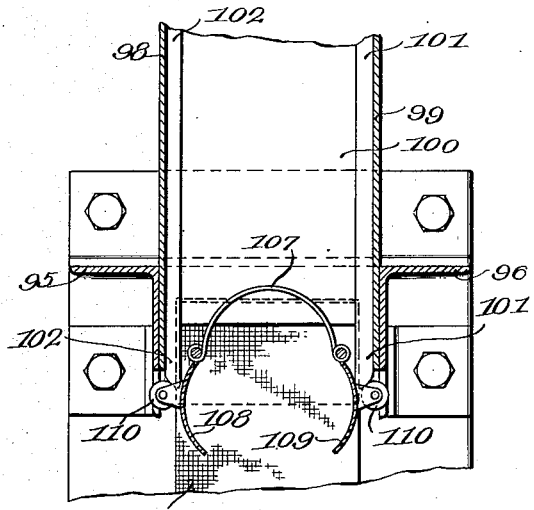
Inventor
Orie Shackelford
By Cushman Darby Cushman
Attorneys

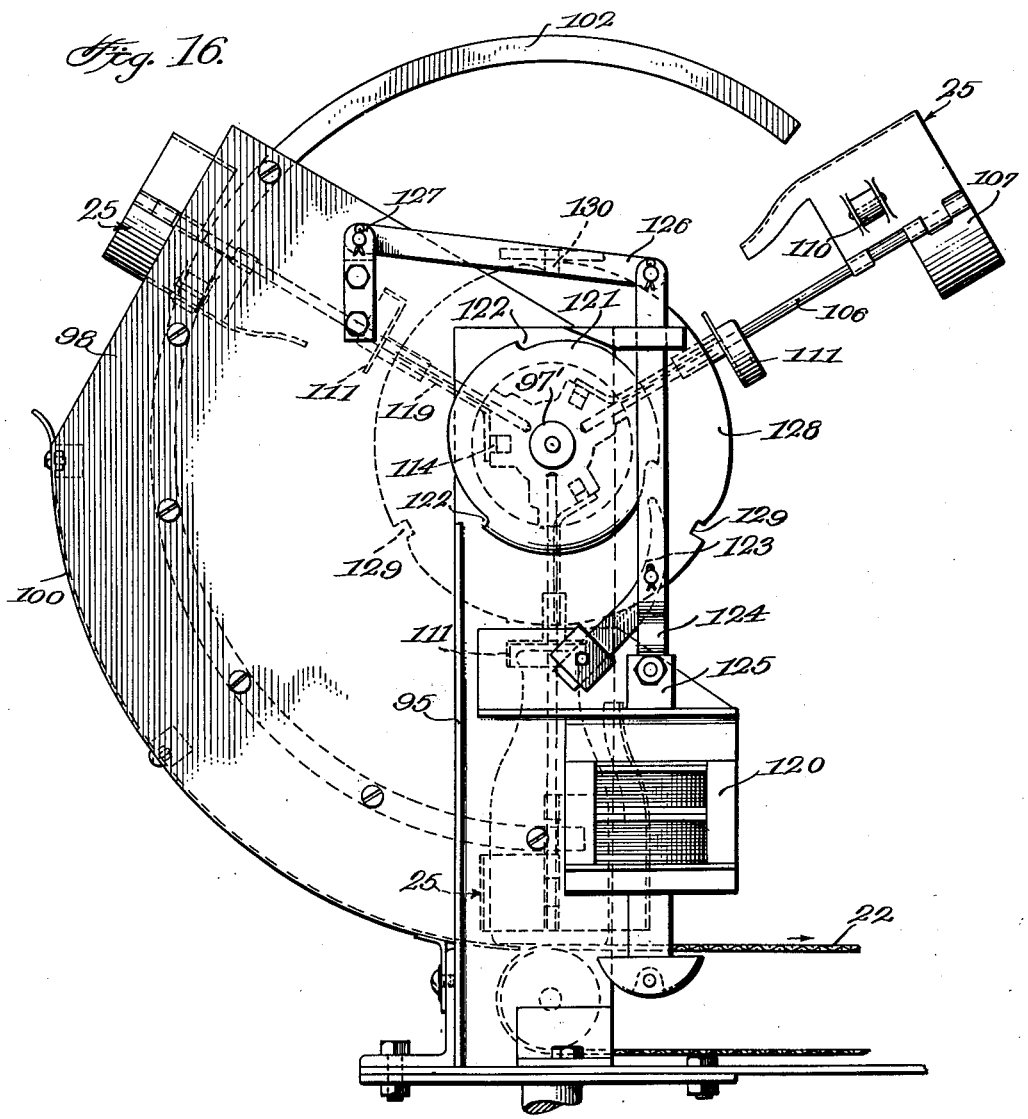

March 19, 1940.  O. SHACKELFORD  2,193,942
GLASSWARE RECEIVING, CONVEYING, AND UPRIGHTING APPARATUS
Filed April 5, 1937  7 Sheets-Sheet 7
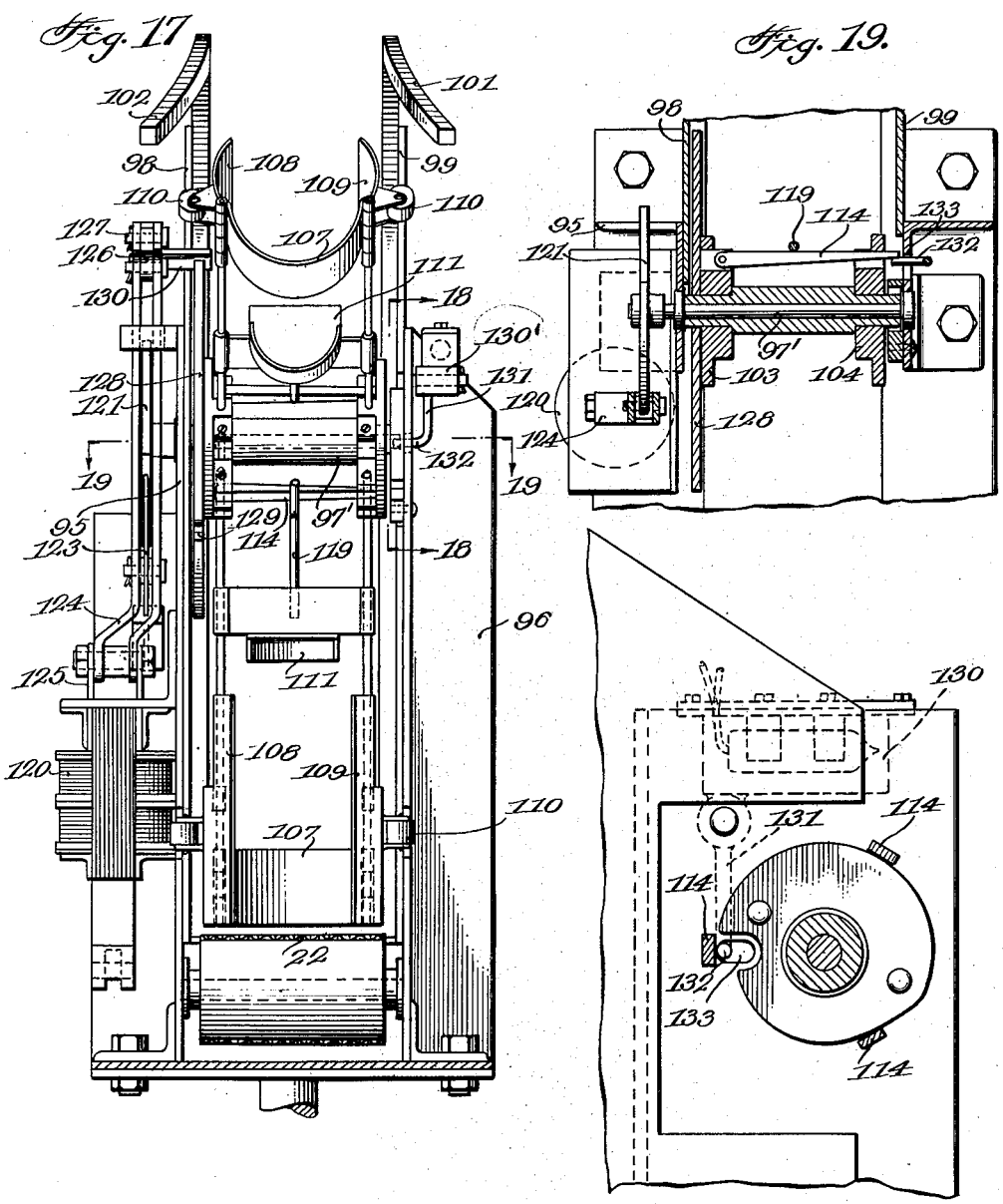
Inventor
Orie Shackelford
By Cushman Darby Cushman
Attorneys Patented Mar. 19, 1940

2,193,942

UNITED STATES PATENT OFFICE 2,193,942

GLASSWARE RECEIVING, CONVEYING, AND UPRIGHTING APPARATUS

Orie Shackelford, Fairmont, W. Va.

Application April 5, 1937, Serial No. 135,175

12 Claims. (Cl. 198—25)

This invention relates to glassware handling apparatus. More particularly, it relates to means for receiving articles of glassware in a hot, slightly plastic condition from a forming machine, and to means for conveying and uprighting such articles in a manner so as to prevent distortion of the shape imparted thereto by the forming machine. The invention contemplates an apparatus that will receive articles, such as glass bottles, in the neck down position from a forming machine, convey them in that position gently and without distortion, and then upright them from the neck down to the neck up position standing on their bottoms. Finally the apparatus conveys them to a lehr, a lehr stacker, or the like.

It is well known in the art that articles of glassware, such as blown bottles, are highly heated and slightly plastic when they are discharged from the bottle blowing machine. Unless considerable care is exercised in the initial handling of such bottles the shape given them by the blowing machine will be distorted before they become sufficiently cool to receive a permanent set. It is an object of the present invention to provide novel bottle receiving and supporting means which will receive the bottles, support them on their sides, and continuously rotate the bottles about their longitudinal axes to continuously change their points of support. This action serves to prevent the formation of dents or the like at the points of support, and to prevent sagging or bending of portions of the bottles under the influence of gravity.

It is a further object of the invention to convey the bottles away from the forming machine while they are thus supported and rotated about their axes.

It is a still further object of the invention to provide novel means for receiving the bottles from such a conveyor in the neck down position and for inverting or uprighting the bottles and positioning them on their bottoms in upright position on a discharge conveyor, leading to a lehr stacker or the like.

The invention also contemplates certain novel automatic control features as hereinafter described. Moreover, further objects and advantages of the invention will be apparent to one skilled in the art, after a consideration of the following description of the illustrative embodiments of the invention shown in the accompanying drawings.

In the drawings:

Figure 1 is a side elevation of one embodiment of the invention.

Figure 2 is a section on line 2—2 of Figure 1.

Figure 3 is a section on line 3—3 of Figure 1 with certain parts omitted.

Figure 4 is a section on line 4—4 of Figure 1.

Figure 5 is a plan view, partly in section, and with certain parts broken away, showing the discharge end of the inclined conveyor.

Figure 6 is a fragmentary longitudinal sectional view on line 6—6 of Figure 5.

Figure 7 is a longitudinal vertical sectional view, taken through a modified form of an inclined conveyor.

Figure 8 is an end view, partly in section, taken on line 8—8 of Figure 7.

Figure 9 is a side elevation, partly in section of a detail of Figure 7.

Figure 10 is a vertical sectional view of a preferred form of uprighting device, on a larger scale than the same mechanism is shown in Figure 1.

Figure 11 is a transverse, vertical section taken on line 11—11 of Figure 10.

Figure 12 is a fragmentary vertical section on line 12—12 of Figure 11.

Figure 13 is a similar view taken on line 13—13 of Figure 11.

Figure 14 is a horizontal sectional view taken on line 14—14 of Figure 11.

Figure 15 is a horizontal section on line 15—15 of Figure 11.

Figure 16 is a side elevation of a modified form of uprighting device.

Figure 17 is an end elevation of the device of Figure 16, looking from the right hand side thereof.

Figure 18 is a fragmentary longitudinal vertical sectional view, taken on line 18—18 of Figure 17.

Figure 19 is a horizontal section taken on line 19—19 of Figure 17.

Referring to Figure 1, the apparatus of the invention comprises, in combination, a downwardly inclined conveyor 20, an uprighting device 21, and a horizontal discharge conveyor 22, leading to a lehr stacker or the like 23. Bottles 24 are received on the upper end of the inclined conveyor 20 directly from a forming machine by any appropriate means, such as a simple guide chute or the like, not shown. The bottles travel down the conveyor under the influence of gravity toward the uprighting device 21. They are received in appropriate receptacles 25 associated with that device and are then swung downwardly and uprighted and positioned on the horizontal conveyor 22. This conveyor serves to carry them to a lehr stacker or the like.

The inclined conveyor 20 preferably comprises a pair of spaced, parallel, inclined rolls 26, 27 journalled in end pieces 29, 30 of an appropriate supporting frame 31. This frame at its upper end is adjustably supported by means of a standard 32, nut 33 and bolt 34, as shown in Figure 1. A similar support 35 is provided for the lower end of the frame.

Constant rotation in the same direction is imparted to the two rolls through pinions 36, 37 associated therewith and a driving gear 38, in mesh with the pinions, as shown in Figure 2.

Referring to Figures 2 and 5, the gear 38 is fixed to a stub shaft 39 carrying a bevel gear 40, in mesh with a similar gear 41 on the inner end of a transverse shaft 42. The latter carries a sprocket 43 which is driven by a chain 44. The chain may conveniently be driven directly from the horizontal conveyor 22, or from the same mechanism that operates that conveyor.

The rolls 26, 27 are preferably covered with a somewhat soft or resilient heat resisting material, such as asbestos, or a combination of asbestos, rock wool, rubber or any suitable binder.

Means are provided, in the form of bottle arresting stops, for controlling the movement of the bottles down the inclined conveyor. These stops may be operated to effect an intermittent movement of the bottles as shown in Figures 1 to 5, or to effect a continuous movement, as shown in Figures 7 to 9.

Referring to the first form of conveyor, a plurality of stops 45 are pivoted to cross shafts 46 journalled in the frame 31. Since each stop is substantially the same as the others, a description of one will suffice. As shown in Figures 4 to 6, a rod 47 projects upwardly from the shaft 46 between the parallel rolls. At its upper end, this rod 47 preferably carries a horizontal roller 48 adapted to support the periphery of the neck finish of the bottle, and a vertical roller 49 positioned to similarly engage the end of the neck finish. Thus, when the downward movement of the bottle is being arrested by these stops, the free rotation of the bottles about their longitudinal axes is facilitated by the anti-friction rollers 48, 49.

Associated with each stop 45 is a spring finger 50, welded or otherwise secured to a collar fixed on the shaft 46. These spring fingers serve to retard the downward movement of the bottles, prior to their engagement with the rollers 48, 49.

A weight 51 is preferably adjustably mounted on a rearwardly projecting rod 52, also fixed to the shaft 46 by an appropriate collar 53. The weight serves to urge the rod 47 and the spring finger 50 upwardly to bottle engaging position.

The shaft 46 carries a latch disc 54 on its end, outwardly of the frame 31, as shown in Figures 1 and 4. A detent 55 is pivoted to the frame adjacent the disc 54 in position to engage an abutment on the disc to hold it in the position to which it is turned by the weight 51. The detent 55 has an upwardly projecting end 56 positioned adjacent a longitudinal rod 57 having collars 58 fixed thereon. The rod is normally urged upwardly by a spring 59, positioned between a guiding eye 60 and a collar 61. The armature 62 of a solenoid 63 is positioned to operate a lever 64 having one of its ends in engagement with a collar 65 fixed to the rod 67. Upon actuation of the solenoid, the lever 64 forces the rod 57 downwardly against the action of the spring 59, thereby lifting each of the detents 55 out of engagement with the latch discs 54. When this occurs, the weight of the bottles acting on the spring fingers 50 is sufficient to depress the rods 47 and abutment rollers 48, 49, whereupon the bottles pass over the bottle arresting stops and move downwardly. Since the solenoid will be immediately deenergized, the rod 57 will move upwardly and the detents 55 will catch the discs 54 as soon as they are turned by the weights 51 in a counterclockwise direction. Thus, the bottle arresting stops will be immediately returned to their bottle arresting positions upon the passage of a single bottle.

The solenoid is preferably controlled by the reception of a bottle at the upper end of the conveyor. For this purpose, a detector finger 66, pivoted to a cross shaft 67 projects upwardly between the rolls in the path of the bottles. A mercury switch or the like 68 is supported from the shaft 67 by a rod 69. Thus, a bottle, such as the upper bottle shown in Figure 1 will engage the finger 66 and tip the mercury switch 68, thereby completing the circuit to the solenoid 63 to release all the bottles on the conveyor and permit them to move downwardly one step. The bottles are fed to the incline conveyor and are discharged therefrom at a rate corresponding to the time cycle of operation of the uprighting device 21. Obviously, some little time is consumed by the uprighting device in swinging a bottle from the neck down position to the neck up position, and the means as described above insures an appropriate time delay in the feeding of bottles to the uprighting device.

The form of inclined conveyor shown in Figures 7 to 9 has certain advantages over the form just described, and, in many cases, is preferred because it effects a continuous movement of bottles down the conveyor, and the slight jars which are incident to the intermittent travel in the first form are entirely eliminated.

An appropriate frame 70 projects upwardly from the roll frame 31 as shown in Figure 8. This frame carries transverse shafts 71, 72 at its upper and lower ends. Sprockets 73, 74 are fixed to these shafts and a continuous band, such as the sprocket chain 75 is trained about them. The inner faces of the frame 70 carry upper and lower tracks 76, 77, which may be conveniently formed of angle irons as shown in Figure 8. Certain spaced links in the chain 75 carry cross pieces 78 having their ends slidably mounted in the aforesaid tracks. The plates 78 are provided with outwardly projecting flanges 79 having rotatably mounted thereon, abutment plates 80 disposed in the path of the bottles above the rotatable rolls 26, 27. The rotatable abutment plates permit the bottles to rotate on the rolls without undue friction.

The chain 75 and the bottle engaging members 80 carried thereby may conveniently be driven by the driving means for the rolls 26, 27. The shaft 42' shown in Figure 8 is driven by the chain 44, connected to the horizontal, discharge conveyor 22. A chain 81 drives the shaft 72 by means of a sprocket 82 loosely mounted thereon, through a friction clutch 83 of conventional design.

Means are provided to make certain that the bottle arresting stops 79 are in proper position to receive each bottle fed to the conveyor from the forming machine. A preferred control will now be described.

A disc 85 having a notch 86 on its periphery is fixed on the shaft 72. A solenoid 87 is positioned so that its armature 88 may enter the notch when the solenoid is deenergized. The current to the solenoid is controlled by a mercury switch or the like 89 carried by a shaft 90 having a detector finger 91 projected upwardly therefrom into the path of the bottles at the entrance end of the conveyor.

The parts are so proportioned that the notch 86 passes the armature once each time a bottle arresting abutment 79 reaches the correct position to receive a bottle. If a bottle is moving downwardly on the conveyor at the proper time, the finger 91 will be depressed, the circuit to the solenoid closed, and the armature lifted so that the disc will rotate continuously and the movement of the chain 75 will not be arrested. After the bottle has passed the finger 91, the solenoid will be deenergized and the armature will drop down on the smooth periphery of the disc 85, but obviously, it will not affect the movement of the chain. If another bottle is not received on the conveyor in sufficient time to withdraw the armature from engagement with the disc, however, the armature will drop down into the notch and the movement of the chain will be arrested until the bottle is received. The stopping of the chain 75 is permitted by slippage of the friction clutch 83.

The chain 75 preferably moves at the same speed as the discharge conveyor 22, or at a speed correlated therewith in a particularly desired manner to effect a desired spacing of the bottles on the discharge conveyor.

The uprighting device in accordance with the present invention comprises a pair of spaced, upwardly projecting frame members 95, 96 having a shaft 97 journalled therein adjacent their upper ends. Side plates 98, 99 extend rearwardly from the uprights and an arcuate bottom plate 100 is secured thereto. The side plates 98, 99 carry a pair of cam tracks 101, 102 for purposes hereinafter described.

Upon the shaft 97 there is fixed a hub comprising heads 103, 104. Three pairs of rods 105, 106 project radially from the hub. At their outer ends these rods carry the bottle receiving receptacles 25, each of which comprises a semi-cylindrical guard piece 107 and a pair of pivoted doors 108, 109, forming, when in closed position a bottle receiving and supporting pan. The doors are provided on their exterior surfaces with rollers 110, adapted to cooperate with the cam tracks 101 as hereinafter described.

Upon each pair of radial rods 105, 106 there is slidably mounted an abutment plate 111 adapted to engage the neck end of a bottle to limit its inward movement in the bottle receiving receptacles. The slidable connection between the plate 111 and the rods is effected by a cross plate 112 having its ends curled around the rods, as shown in Figures 10 and 11. When a bottle displaces the abutment plate 111 and the cross piece 112, it serves to release a latch mechanism to permit the weight of the bottle to swing the receptacle downwardly to upright the bottle. The latch mechanism will now be described.

The head 103 of the hub is provided with three slots 113, in each of which is pivoted a latch bar 114. The free end of this member projects through openings 115 in the opposite head 104 of the hub. On the inner face of the upright 96, adjacent the journal for the shaft 97 there is positioned a stationary cam and abutment device comprising a generally spiral cam 116 and a block 117. The block is provided with an abutment surface 118 at its upper end to engage the free end of each latch bar 114, to stop the rotation of the hub and the revolution of the receptacles about the axis of the shaft 97 at the proper position.

Fitted to the cross plate 112 there is an operating bar 119 extending downwardly in engagement with the associated latch bar 114, as shown in Figures 10 and 14. Thus, when the abutment plate 11 is depressed by the neck of a bottle in the receptacle 25, the associated latch bar 114 will be pushed radially inwardly toward the shaft 97 by the operating bar 119. In other words, the end of the bar 114 as shown in Figure 13 will be shifted toward the right, out of engagement with the abutment surface 118 of the block 117, and into the space between the block and the spiral cam 116. The receptacle 25 will then swing downwardly under the influence of the weight of the bottle, until the next latch bar engages the abutment 118 to stop further rotation of the parts. The spiral edge of the cam plate 116 serves to move the free end of each latch bar outwardly as it approaches the abutment 118 to assure a proper operative engagement between the parts.

The upper ends of the cam tracks 101, 102 are preferably curved outwardly substantially as shown in Figure 11. The lower ends of the tracks terminate adjacent the upright position of the receptacles 25, as shown in Figures 10 and 15. When the rollers 110 pass the lower ends of the cam tracks, the doors 108, 109 are free to open, to permit the removal of a bottle positioned in upright relation on the conveyor belt 22. The bottles simply move along on the conveyor and, during such movement, serve to open the doors.

As the receptacles move around toward the upper ends of the tracks, they may close by their own weight, or the curved upper ends of the tracks may engage the rollers 110 to force them to closed position. In any event, the tracks serve to maintain the doors in closed, bottle holding position during the time that it is desired to support the bottle therein.

The semi-cylindrical rear members 107 of the receptacles 25 are not, in all cases, necessary, since the doors alone constitute an effective bottle supporting pan.

In some cases, particularly with small, light weight bottles, it has been found that the action of the uprighting device is somewhat sluggish, when gravity alone is relied upon to swing the bottles from the neck down position to the upright position. In order to overcome this difficulty, an attachment similar to that shown in Figures 16 to 19 may be employed. A solenoid 120 is utilized to give the rotatable hub and the bottle receiving receptacles carried thereby an initial impulse or kick, to speed up their movement. The shaft 97' is extended outwardly through the frame member 96 and a ratchet wheel 121 is fixed thereon. This wheel has three peripheral notches 122, adapted to be engaged by a pawl 123 pivoted between a pair of parallel bars 124, connected to the armature 125 of the solenoid. The bars 124 are connected at their upper ends to a lever 126 pivoted to the frame at 127.

The shaft 97' also carries a disc 128, inwardly of the frame member 96. This disc is provided with a plurality of peripheral notches 129 adapted to receive an inwardly projecting lug 130 carried by the lever 126. When the solenoid is deenergized, the weight of the parts causes the lug 130 to rest upon the periphery of the disc 128 and drop into the approaching notch 129 to stop the rotation of the parts and position the receptacles accurately with respect to the inclined conveyor and the horizontal discharge conveyor.

A mercury switch 130' (Figs. 17 and 18) or the like is pivoted to the frame member 95 and connected in circuit with the solenoid 120. The switch is provided with a depending finger 131 having a hooked end 132 projecting inwardly through an opening 133 in the frame member, into proximity with the free end of the latch bar 114. Thus, when a bottle is received in the receptacle 25, the latch bar 114 will engage the end 132 of the finger 131 to tip the mercury switch and energize the solenoid 120. The armature 125 and the parts connected thereto will immediately be forced upwardly, and the pawl 123 will rotate the ratchet wheel 121 through one-third of a revolution. The rotation of the parts will be terminated by the lug 130 dropping into the appropriate notch 129 in the disc 128. In all other respects, the second form of uprighting device operates in the same manner as the first form.

I claim:

1. In glassware handling apparatus, an uprighting device comprising a plurality of pivotally mounted receptacles, means for holding one of said receptacles in an upper inclined bottle receiving position aligned with an in-feed conveyor, whereby the receptacle may directly receive a bottle neck down from the conveyor, means actuated by the reception of a bottle in said receptacle to release said holding means and to permit the receptacle to swing downwardly under the influence of gravity to an upright position, said downwardly swinging movement serving to bring another of said receptacles into said position aligned with said conveyor, and means for removing the uprighted bottle from said receptacle.

2. In glassware handling apparatus, an uprighting device adapted to receive bottles from the lower end of an inclined conveyor down which the bottles travel in neck-down position, said device being adapted to deliver bottles to a horizontal discharge conveyor positioned therebelow, said device comprising a pivotally mounted receptacle, a latch for holding the same in an inclined bottle receiving position aligned with the inclined conveyor, whereby the receptacle may directly receive a bottle neck-down from the inclined conveyor, means actuated by the reception of a bottle in said receptacle to release said latch and permit the receptacle to swing downwardly to an upright position above said discharge conveyor, and means for releasing the uprighted bottle from the receptacle to permit the same to be carried away on said conveyor.

3. Apparatus for uprighting bottles comprising a hub journalled on a horizontal axis, a bottle receiving receptacle carried by said hub for swinging movement in an arcuate path from an inclined position to an upright, substantially vertical position, a latch carried by said hub to lock said receptacle in the first mentioned position, and means actuated by the reception of a bottle in said receptacle to release said latch and to permit the receptacle to swing to the second mentioned position.

4. Apparatus for uprighting bottles comprising a hub journalled on a horizontal axis, a plurality of open bottom bottle receiving receptacles carried by and projecting radially from said hub, each of said receptacles being movable upon rotation of said hub successively from an inclined bottle receiving position to an upright, substantially vertical, bottle discharging position, a latch carried by said hub to lock the receptacles successively in the first mentioned position, and means actuated by the reception of a bottle in the receptacles when at such position to release said latch and permit the receptacles to swing to the discharging position.

5. Apparatus for uprighting bottles comprising a hub journalled on a horizontal axis, a plurality of open bottom bottle receiving receptacles carried by and projecting radially from said hub, each of said receptacles being movable upon rotation of said hub successively from an inclined bottle receiving position to an upright, substantially vertical, bottle discharging position, a stationary abutment adjacent one end of said hub, a plurality of latches carried by said hub and successively engageable with said abutment to position said receptacles successively in the first mentioned position, a member associated with each receptacle positioned to be engaged by a bottle received therein, and a connection from each of said members to the associated latch, to shift the latch out of engagement with said abutment, to permit the hub to rotate and the receptacles to move to the second mentioned position.

6. An apparatus for uprighting bottles comprising a hub journalled on a horizontal axis, a plurality of bottle receiving receptacles projecting outwardly from said hub, said receptacles being revoluble about the axis of said hub under the influence of the weight of bottles placed in the receptacles when they are at an upper, inclined, bottle receiving position, the receptacles being movable successively from that position to a substantially vertical bottle discharging position, means for arresting the receptacles successively as they arrive at the upper position, and means controlled by the reception of a bottle in a receptacle at that position to render the arresting means ineffective.

7. An apparatus for uprighting bottles comprising a hub journalled on a horizontal axis, a plurality of bottle receiving receptacles projecting outwardly from said hub, said receptacles being revoluble about the axis of said hub under the influence of the weight of bottles placed in the receptacles when they are at an upper, inclined, bottle receiving position, the receptacles being movable successively from that position to a substantially vertical bottle discharging position, means for arresting the receptacles successively as they arrive at the upper position, means controlled by the reception of a bottle in a receptacle at that position to render the arresting means ineffective, and power means controlled by the last mentioned means for initiating the movement of each receptacle from the upper position toward the lower, discharge position.

8. An apparatus for uprighting bottles comprising a hub journalled on a horizontal axis, a plurality of bottle receiving receptacles projecting outwardly from said hub, said receptacles being revoluble about the axis of said hub to move from an upper, inclined, bottle receiving position to a lower, substantially vertical, bottle discharging position, a solenoid operatively connected to said hub to impart positive rotation thereto, and control means for actuating said solenoid operated by the reception of a bottle in each of said receptacles when the latter are at the upper bottle receiving position.

9. An apparatus for uprighting bottles comprising a hub journalled on a horizontal axis, a bottle holding receptacle projecting radially from said hub, said receptacle comprising a pair of doors pivotally movable to a closed bottle holding position, said receptacle being movable upon rotation of said hub from an upper bottle receiving position to a lower, substantially vertical, bottle discharging position, and cam means for maintaining said doors in closed, bottle holding position during said movement of the receptacle, said cam means terminating adjacent the bottle discharging position, whereby the doors are free to open to permit the discharge of a bottle therefrom.

10. In glassware handling apparatus, an uprighting device comprising a plurality of bottle receiving receptacles revoluble about a horizontal axis from an upper inclined position in alignment with an inclined in-feed conveyor to a lower, substantially vertical discharge position above a horizontal discharge conveyor, each of said receptacles comprising a pair of pivoted doors adapted to support a bottle when in closed position, and cam means extending from the upper position to the lower position and adapted to maintain said doors in the closed, bottle supporting position, said cam means terminating adjacent the bottle discharging position, whereby uprighted bottles placed upon the horizontal conveyor by the receptacles, are free to open said doors as the bottles move away on the horizontal conveyor.

11. An apparatus for uprighting bottles comprising a hub journalled on a horizontal axis, a plurality of bottle holding receptacles projecting radially from said hub, each of said receptacles comprising a pair of doors pivotally movable from an open position to a closed bottle holding position, said receptacles being movable upon rotation of said hub from an upper bottle receiving position to a lower, substantially vertical, bottle discharging position, and stationary cam tracks extending from a point above the upper position substantially to the lower position, said tracks being engageable with said doors to move them to closed bottle holding position as the receptacles approach the upper position, the tracks being positioned to disengage the doors adjacent the bottle discharging position, whereby the doors are free to open to permit the discharge of the bottle from the receptacle.

12. An apparatus for uprighting bottles comprising a horizontally journalled hub, a plurality of pairs of spaced rods projecting radially therefrom, a pair of curved doors pivoted on each pair of rods movable to closed position to provide bottle supporting pans, stop plates slidably mounted on each pair of rods adapted to be engaged by the neck of a bottle supported by said pans, cam track means for closing the doors as the pans approach a bottle receiving position and for maintaining them closed until they reach a bottle discharging position, and a latch mechanism controlling rotation of said hub and the movement of said pans and actuated by said stop plates.

ORIE SHACKELFORD.